United States Patent
Hughes et al.

(10) Patent No.: US 6,759,909 B2
(45) Date of Patent: Jul. 6, 2004

(54) RF ENERGY DISPERSAL IN SYSTEMS CONSISTING OF AGGREGATED COMPUTING ELEMENTS AS SUBSYSTEMS

(75) Inventors: James Edward Hughes, Apex, NC (US); George Courtney Long, Jr., Chapel Hill, NC (US); Rudolf Eugene Rehquate, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 10/064,217

(22) Filed: Jun. 21, 2002

(65) Prior Publication Data

US 2003/0234692 A1 Dec. 25, 2003

(51) Int. Cl.[7] .................................................. H03L 7/07
(52) U.S. Cl. ........................ 331/2; 331/46; 713/500; 327/551
(58) Field of Search ............................. 331/2, 16–18, 331/46–49, 56, 91; 327/551; 713/500–503

(56) References Cited

U.S. PATENT DOCUMENTS

| | | | |
|---|---|---|---|
| 3,775,696 A | 11/1973 | Garth | 331/57 |
| 4,507,796 A | 3/1985 | Stumfall | 375/376 |
| 4,695,808 A * | 9/1987 | Cabaniss et al. | 331/57 |
| 4,954,929 A | 9/1990 | Baran | 361/794 |
| 5,287,100 A | 2/1994 | Guttag et al. | 345/213 |
| 5,293,468 A | 3/1994 | Nye et al. | 345/593 |
| 5,309,551 A | 5/1994 | Guttag et al. | 345/593 |
| 5,317,207 A * | 5/1994 | Mortensen | 326/26 |
| 5,416,443 A | 5/1995 | Cranford, Jr. et al. | 331/2 |
| 5,430,392 A | 7/1995 | Matejic | 327/113 |
| 5,442,475 A | 8/1995 | Bausman et al. | 395/140 |
| 5,448,496 A | 9/1995 | Butts et al. | 716/16 |
| 5,488,627 A | 1/1996 | Hardin et al. | 375/139 |
| 5,537,498 A | 7/1996 | Bausman et al. | 385/24 |
| 5,565,816 A * | 10/1996 | Coteus | 331/2 |
| 5,610,955 A | 3/1997 | Bland | 375/376 |
| 5,729,720 A | 3/1998 | Kau et al. | 713/500 |
| 5,736,893 A * | 4/1998 | Puckette et al. | 327/551 |
| 5,754,436 A | 5/1998 | Walsh et al. | 713/300 |
| 5,754,837 A | 5/1998 | Walsh et al. | 713/300 |
| 5,771,373 A | 6/1998 | Kau et al. | 713/500 |
| 5,781,074 A | 7/1998 | Nguyen et al. | 331/105 |
| 5,802,317 A * | 9/1998 | Wiseman et al. | 710/100 |
| 5,867,717 A | 2/1999 | Milhaupt et al. | 713/323 |
| 5,889,819 A | 3/1999 | Arnett | 375/270 |
| 5,909,144 A | 6/1999 | Puckette et al. | 327/551 |
| 5,909,472 A | 6/1999 | Arnett | 375/362 |
| 5,926,053 A | 7/1999 | McDermott et al. | 327/298 |
| 5,956,289 A | 9/1999 | Norman et al. | 365/233 |
| 6,014,063 A | 1/2000 | Liu et al. | 331/78 |
| 6,125,217 A | 9/2000 | Paniccia et al. | 385/14 |
| 6,144,242 A * | 11/2000 | Jeong et al. | 327/269 |
| 6,184,736 B1 | 2/2001 | Wissell et al. | 327/295 |
| 2001/0011313 A1 | 8/2001 | Hungerbuehler et al. | 710/102 |

* cited by examiner

Primary Examiner—Minh Nguyen
(74) Attorney, Agent, or Firm—Carlos Munoz-Bustamante (57) ABSTRACT

A cluster of processing systems wherein each system is set to operate at a unique operating frequency. Each unique frequency is set to differ from each other by at least a predetermined frequency differential or bandwidth. When clustered, the radiated emissions will not add. Rather, the RF energy is distributed over the predetermined frequency bandwidth and in so doing achieve a reduction of measured RF energy at any singular frequency. By using RF energy dispersal in aggregate systems, the need for special or additional RF shielding is precluded. Current design and manufacturing techniques can continue to be used. Thus, reducing the overall cost of implementing aggregated systems.

12 Claims, 6 Drawing Sheets

RF ENERGY DISPERSAL IN SYSTEMS CONSISTING OF AGGREGATED COMPUTING ELEMENTS AS SUBSYSTEMS

BACKGROUND OF INVENTION

This invention pertains to the aggregation of computer systems and other devices requiring a clock or oscillator and, more particularly, to the mitigation of electromagnetic interference of the aggregation.

Devices that have embedded oscillators or clocks inherently emit electromagnetic energy. The energy is emitted at frequencies related to the fundamental frequency of the oscillator or clock. This emitted energy is both undesirable and parasitic to other devices. The related frequencies can be of any component of the oscillator frequency including the fundamental frequency and any harmonics thereof. The harmonic components of the fundamental frequency occur at multiples of the fundamental and at sums and differences between any two or more components.

Devices which have embedded oscillators or clocks require testing for compliance to several government agencies" established requirements. One such agency is the Federal Communications Commission. The established requirements maintain that emissions for any given device remain below a given threshold. The threshold corresponds to an amount of energy per predefined frequency bandwidth which energy could reasonably interfere with a neighboring device. The testing device used in order to determine compliance is usually a spectrum analyzer which sweeps all frequencies of interest and which reports the detected level of emissions per the predefined bandwidth throughout the sweep of frequencies.

Devices are currently produced with a fixed set of one or more oscillators which function as time keepers or clocks. These devices usually take the form of an electronics board assembled in a case with other ancillary parts and creating a working device. As singular elements, each completed device is certified to comply with the defined set of government agency requirements. When clustering and operating more than one of these devices in close proximity, the result is an integrated higher level system. It is this integrated system, the aggregation, when operating, that cannot be expected to meet the original agencies" criteria for each of the elements it is composed of. The problem is that the aggregation of systems generally exceeds the allowed energy/frequency levels set by one or more agencies.

SUMMARY OF INVENTION

An aggregation of devices is provided in which a subset or all of the devices are designed to operate in close proximity of each other. The subset or all of the devices are provided with a programmable oscillator or clock. The devices are linked through an inter-device link. Each proximate device contains a clock frequency controller which couples the inter-device link and the programmable oscillator or clock and which controls the frequency of the programmable oscillator or clock. The frequency of each proximate device is set to operate at a unique operating frequency. Each unique frequency is set to differ from each other by at least a predetermined frequency differential.

BRIEF DESCRIPTION OF DRAWINGS

Some of the purposes of the invention having been stated, others will appear as the description proceeds, when taken in connection with the accompanying drawings, in which.

DETAILED DESCRIPTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Although several of the illustrative embodiments are aggregations of computer systems, it should be kept in mind that the invention is not limited to computer systems and is applicable to other aggregations including switches, routers, hubs, and in general to the aggregation of any system or device which operates based on a clock or oscillator and which emits electromagnetic interference as a function of this clock or oscillator.

Figure 1:
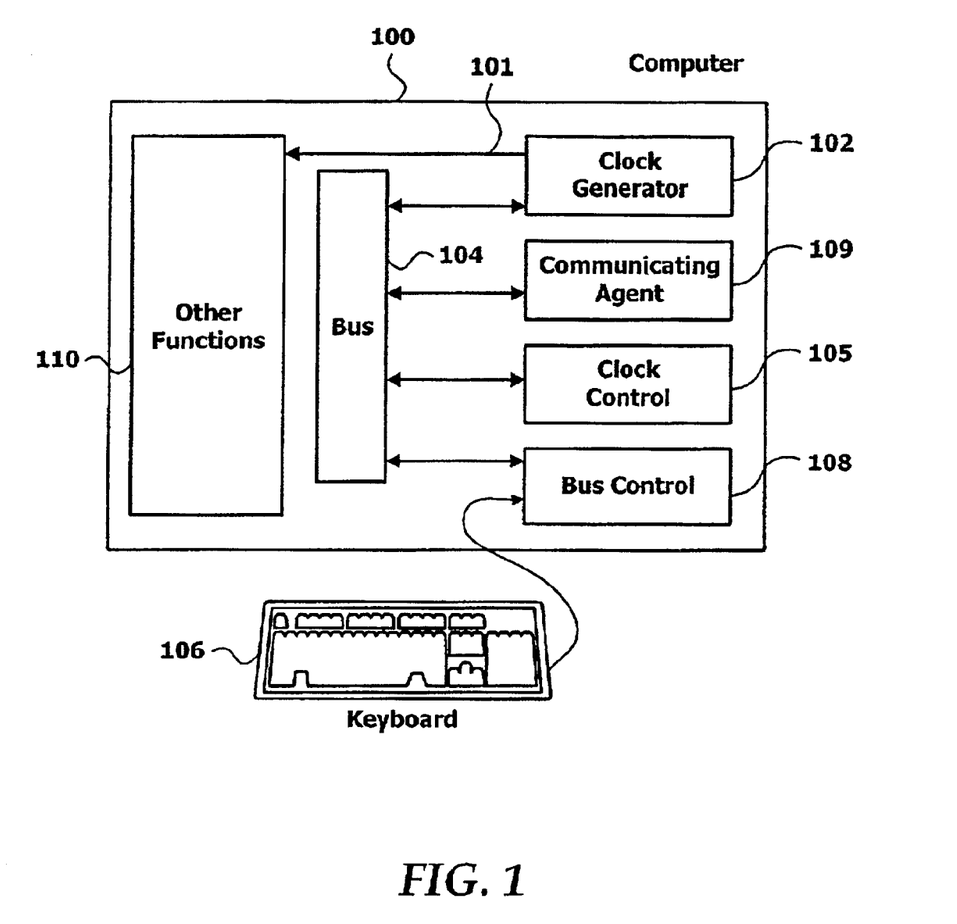
FIG. 1 is a block diagram of a computer system for use in conjunction with the current invention.

Referring now more particularly to the accompanying drawings, FIG. 1 illustrates one type of computer system 100 utilized for the implementation of one embodiment of this invention. In this embodiment, an aggregation of proximate computer systems utilizing the design of computer system 100 is formed. Each computer system 100 implements a bus programmable clock 101 via a bus programmable clock generator 102. The bus programmable generator 102 receives programmable frequency commands through computer system bus 104. The frequency is controlled by clock controller 105 within the system acting by some predetermined set of steps implemented in hardware, software, or a combination of hardware and software. The steps can also include manual steps to be controlled by a user/operator. Optionally, under the control of the clock controller 105, a display (not shown) can be used to display a user prompt and solicit input from the operator and accept user input through a user input device such as optional keyboard 106. Bus controller 108 controls all bus functions and further couples optional keyboard 106. Computer system 100 communicates to other computers through communicating agent 109 from which frequency commands can be transmitted and received. Bus programmable clock 101 can be used directly as the system clock and can also be used as a basis for a series of derived clocks for implementing other functions 110. Other functions 110 can include video, memory, I/O bus, and other intermediate clocks.

Figure 2:
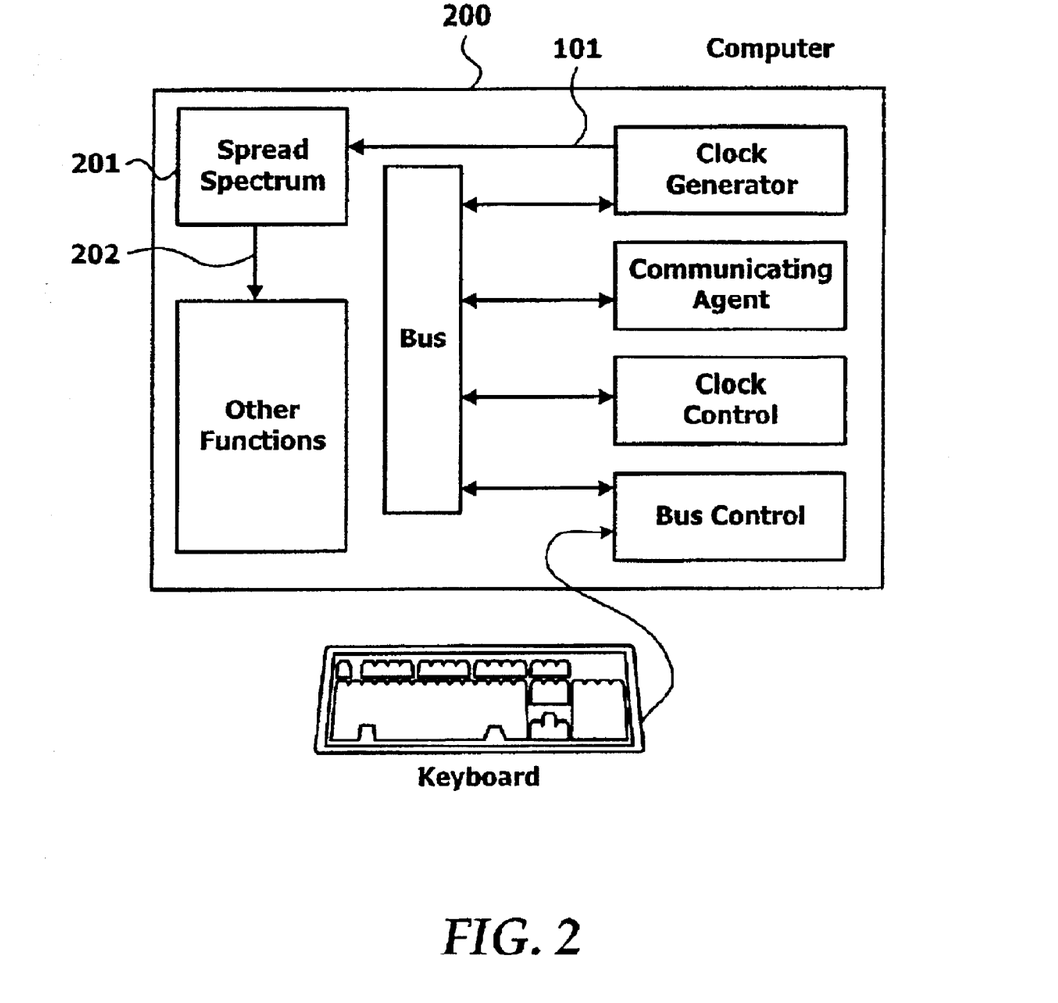
FIG. 2 is a block diagram of a computer system for use in conjunction with the current invention having a set of spread spectrum clocks.

FIG. 2 depicts a computer system 200 which functions similarly to the computer system 100 of FIG. 1. Computer system 200 further implements a spread spectrum clock 202. A spread spectrum clock is a clock whose frequency varies relatively slowly and continuously. In general a spread spectrum clock requires a stable base frequency as in bus programmable clock 101. Spread spectrum controller 201 uses bus programmable clock 101 as a reference signal and operates on it so as to provide outputs which vary in frequency by a certain percentage. Spread spectrum controller 201 can be implemented using any industry standard spread spectrum modules.

Figure 3:
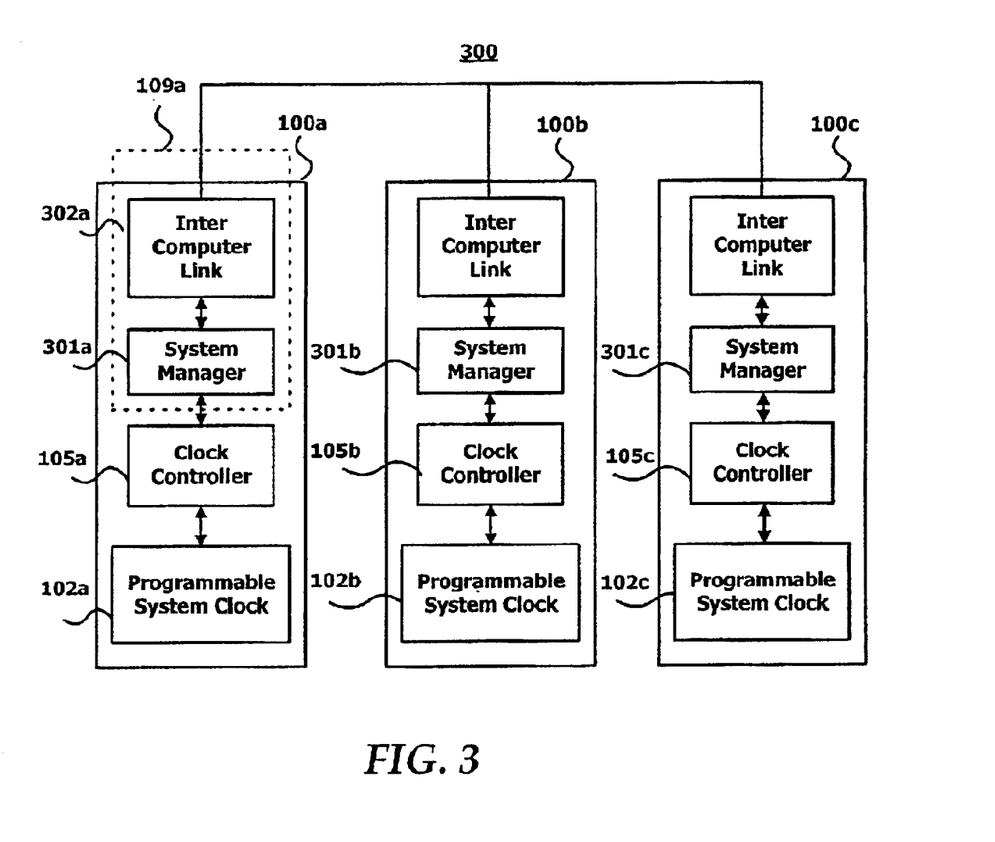
FIG. 3 is a block diagram of a system consisting of aggregated computing elements as subsystems.

FIG. 3 shows an aggregation 300 of like computers 100a, 100b, and 100c which are designed and tested to operate in close proximity of each other. Computers 100a, 100b and 100c may be installed, either proximate to each other in separate housings, or installed into a common housing. Normally each computer 100 is tested to not exceed certain government agency limits on radiated and/or conducted electromagnetic energy. Each of like computers 100a, 100b, and 100c initially operates at the same factory default clock frequency setting. As a result, aggregation 300 emits undesirable electromagnetic emissions which sum at the fundamental frequency and at the harmonic frequencies of the default factory setting. Aggregation 300, therefore, cannot be expected to also pass the same government agency tests. This is so, although to a lesser extent, when computers 100a, 100b, and 100c utilize the spread spectrum design of computer system 200.

To preclude the summation of undesirable electromagnetic emissions, each of the computer systems 100a, 100b, and 100c are set to operate at different frequencies such that no summation of fundamental frequencies and their harmonics occurs. These frequencies are all within a nominal frequency range as required by the circuits but differing by a selected frequency increment resulting in a dispersal of available energy at the nominal fundamental frequency as well as the higher harmonics of the fundamental frequency. The absolute fundamental frequencies of clocks/oscillators of computer systems 100a, 100b, and 100c are separated from each other by an amount as high as the detecting bandwidth of the measuring device. In general these measuring devices are implemented as spectrum analyzers. The theory of these analyzers is that the measured energy is the integrated average sum of the RF energy at all possible discrete frequencies within the analyzer's predefined bandwidth. Any RF energy that is higher or lower than the predefined bandwidth is greatly diminished and effectively not detected. By using RF energy dispersal in systems consisting of aggregated computing elements as subsystems, the need for special or additional RF shielding is precluded. Current design and manufacturing techniques can continue to be used, thus reducing the overall cost to implement aggregated systems.

For example, if aggregation 300 is comprised of twenty four computer systems each operating nominally at 75 MHZ, the system clock generators 102 could have a dispersal range of 4 MHz, incrementing in frequency by 166 kHz. Thus the absolute frequencies could start at 71.000 MHZ, followed by 71.166 MHZ, 71.333 MHZ, 73.500 MHZ and so on ending with 74.833 MHZ and 75.000 MHZ.

In aggregation 300, inter-computer links 302 provide inter-computer communication among the proximate computer systems 100a, 100b, and 100c. Inter-computer links 102 can be any form of network adapter or other I/O subsystem such as an Ethernet adapter card, a Token Ring adapter card, an RS-485 ring, or a USB connection, etc. To allow an operator an effective means to supervising the aggregation 300, each of computer systems 100a, 100b, and 100c is provided with a system manager 301. The system manager 301 and the inter-computer link 302 together form communicating agent 109 of computer 100. Communicating agent 109 can be implemented through IBM's Netfinity Advanced System Management using a Remote Supervisor Adapter™ in each of computer systems 100a, 100b, and 100c. In one embodiment, when a second computer 100b is linked to a first computer 100a, using a Remote Supervisor Adapter™ as the communicating agent 109, a command from system manager 301a is sent to the clock controller 105a to this effect. Clock controller 105a recognizes this command and issues a command to the new computer system 100b to change its factory set frequency to a predetermined different one. In another embodiment, an algorithm invoked in computer system 100a allows for the manual selection of frequencies and their harmonics which cannot be used due to external constrains.

Computer systems 100a, 100b, and 100c can also be managed by a computer system which is remote to aggregation 300 via network connection. This remote computer can act as a master or supervising computer to set the frequency of operation of computer systems 100a, 100b, and 100c. However, in the preferred embodiment, the supervising computer is one of computer systems 100a, 100b, and 100c. This is advantageous because all computer systems at one installation can be of the same design irrespective of whether they are proximate or not. In being of the same design, the computer systems can be lower in cost and take full advantage of the present invention.

In other embodiments, any of computer system 100a, 100b, or 100c can be made the master or supervising computer at any time. The designation of master can be accomplished via a network command to that effect, or via a mechanical switch on the front face of computer 100, or by software executing on any one system.

When computer systems 100a, 100b, and 100c are of like designs, clock controller 105 can act as either the master or the slave device. To act as master, clock controller 105 detects a master operating mode command from the system manager 301 through the inter-computer link 302 or through any other means such as by software executing on the computer system 100. Once detected, the master device can initiate a frequency selection mode and frequency modification mode for itself and for any and all other systems coupled through inter-computer link 302. All other systems coupled through inter-computer link 302 are treated as slave devices. When initially acting as master, the master device can maintain its current operating frequency, or can switch to a default or other frequency and then proceed to selecting and modifying the frequencies of any or all of the slave devices.

Figure 4:
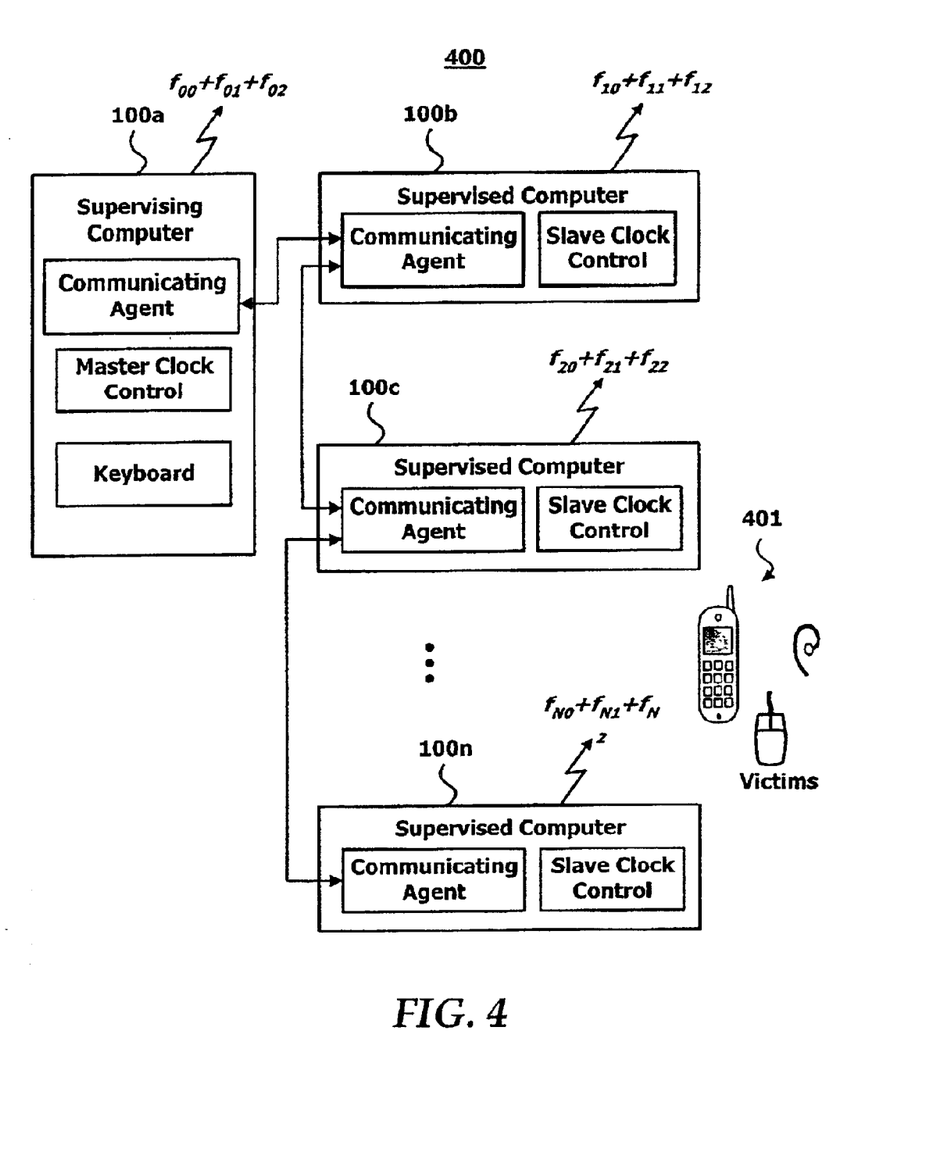
FIG. 4 is a block diagram of a system consisting of aggregated computing elements as subsystems with one of the computing elements functioning as a master device and the remainder of computing elements functioning as slave devices.

FIG. 4 shows an aggregation of computer systems 400 in which one computer system 100a has assumed the supervising master mode of operation, and the remaining computer systems 100b through 100n operate in the slave or supervised mode. Depicted are the victims 401 such as cell phones, mice and audio devices and the undesirably emitted fundamental frequencies, f00, f10, f20, . . . fN0 and their harmonics, f01, f11, f21, . . . fN1, f02, f12, f22, . . . fN2 and so on. When operating as master, computer system 100a selects and optionally modifies its frequency of operation according to the flowchart of FIG. 5. Master computer system 100a then selects and optionally modifies the frequency of operation of each of the slave devices 100b through 100n by transmitting to each of the slave devices a frequency modify command. When operating as slave, computer systems 100b through 100n receive and optionally modify their frequency of operation according to the flowchart of FIG. 6.

Figure 5:
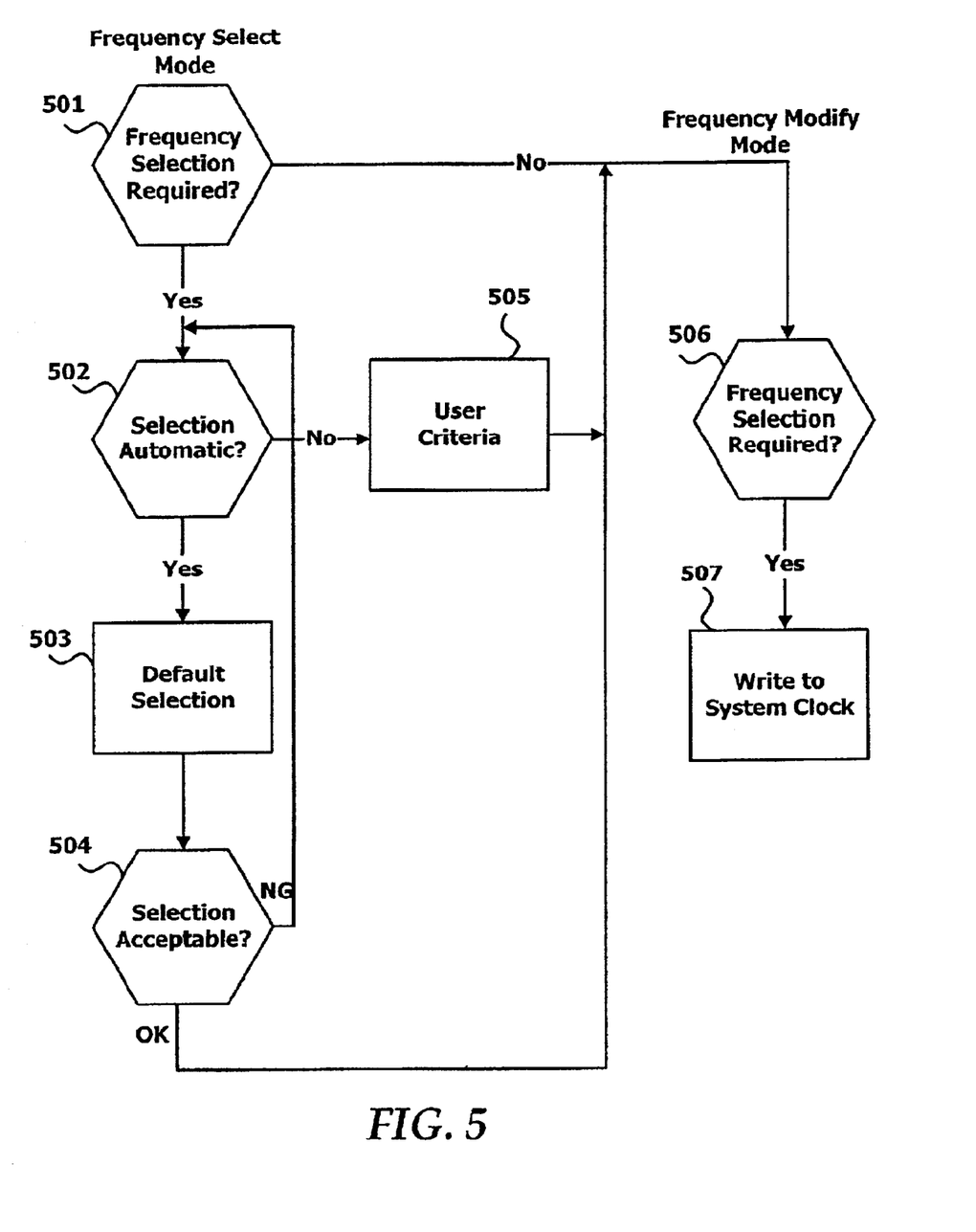
FIG. 5 is a process flow diagram showing the selection and modification of the operating frequency of a device operating in the master mode.

FIG. 5 shows selection and optional modification of the operating frequency of a device operating in the master mode as implemented by clock controller 105. In step 501, it is first detected whether or not frequency selection is required for the master device. The master device can receive command over the network to reset of its own frequency. Once this command is recognized a flag is set to enter the frequency selection mode. The master device can likewise initiate this process on its own. If for any reason selection is not required then the processing flow continues at step 506. If frequency selection is required then process continues at step 502. In step 502, a decision is made as to whether or the selection will be automatic or manual. If frequency selection is not to be made automatically then process flow continues at step 505. At step 505 a user or operator manually enters frequency criteria. The criteria can be to frequencies which are acceptable or to frequencies which are unacceptable. A program can be executed to accept such user input on any computer in the network which has a keyboard 106 and a display (not shown), including the master system 100a. For example, if one of victims 401 is sensitive to the second harmonic f02 of computer 100a, a user can specify f02 as an unavailable frequency. The program can then calculate that the source of interference at frequency f02 is the oscillator of computer of 100a operating at f00. The program can therefore list frequencies f00 and f02 as unavailable. The program running at supervising computer 100a would then select a fundamental frequency different from f00 and then proceed to step 506. If at any later time it is found that frequency f02 is again available, f02 and f00 can be added to list of available frequencies by the operator. The manual selection of frequencies based on user criteria can be implemented in a similar way by the program for each and all slave devices. If the decision of step 502 yields that selection should be autonomic, processing continues at step 503 wherein a default selection is made. At step 504, it is determined whether the selection made in step 503 is an acceptable one. Should the selection be unacceptable, processing continues at step 502. If the selection is found to be acceptable processing then continues at step 506. At step 506, a frequency of operation for the master device has been selected. A flag which signals the selection mode is reset and a flag which signals the frequency modify mode is set. In the frequency modify mode of operation the determination 506 of frequency is made relative to the actual operating frequency of master device 100a. If, as a result of executing either steps 501, 505 or 504, the frequency selected differs from the current operating frequency, processing continues at step 507. In step 507 the clock controller 105 of computer system 100a changes its operating frequency to the selected frequency by executing a bus 104 command to the bus programmable system clock 102. If however, at step 506 the selected frequency is found to be equal to the current operating frequency, then no operation occurs.

The processing of step 505 further maintains a list of all acceptable and unacceptable frequencies. Further, the frequencies maintained in the list are selected to differ in frequency according to the bandwidth of the testing spectrum analyzer. For example the frequencies can be made to differ by at least half the bandwidth of the spectrum analyzer. If the spread spectrum design of computer system 200 is utilized, the frequencies can additionally been made to differ according to the bandwidth of the spread spectrum. For example, the frequencies can be made to differ by at least half of the bandwidth of the spread spectrum.

Figure 6:
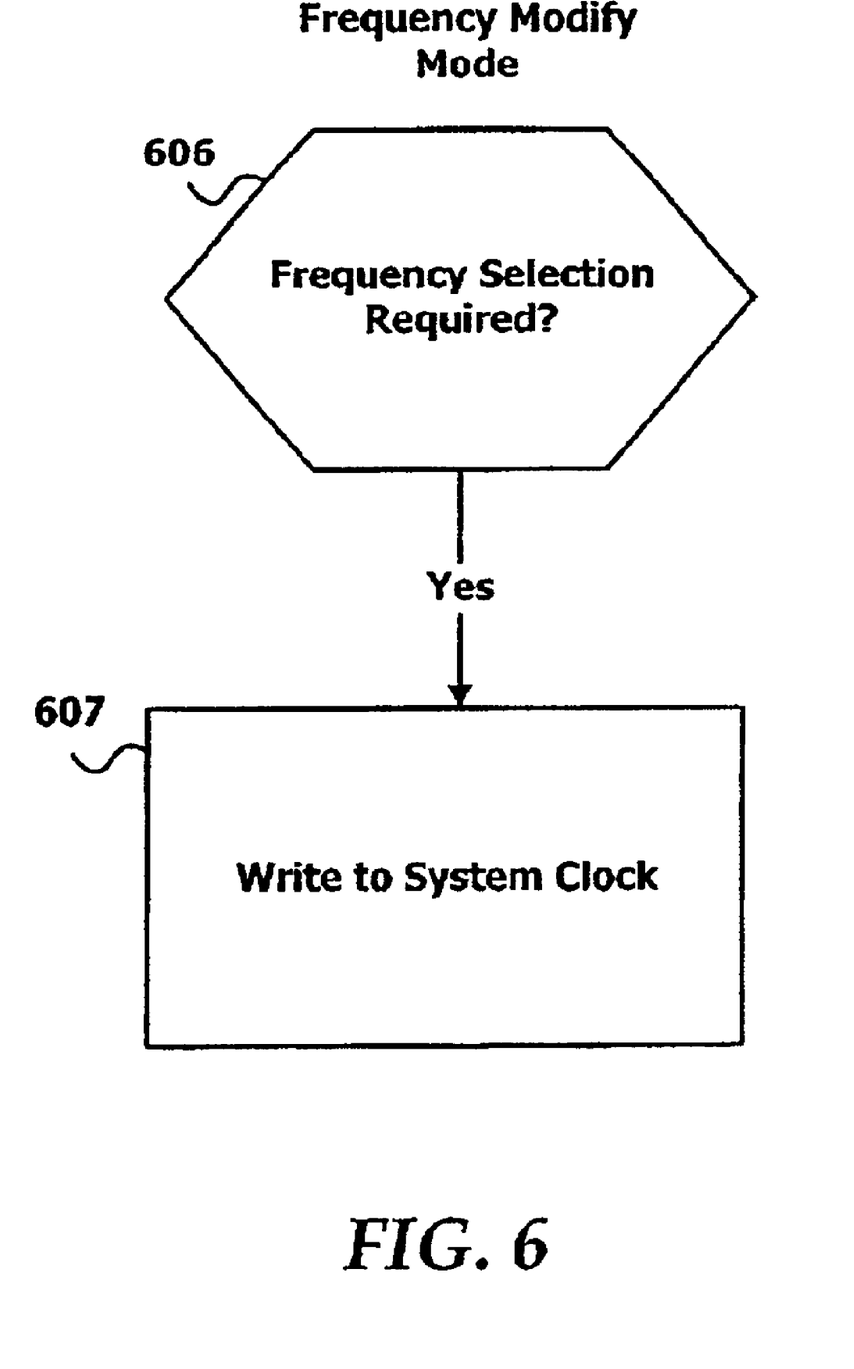
FIG. 6 is a process flow diagram highlighting the frequency modification mode of a slave mode device.

FIG. 6 highlights the frequency modification mode of a slave or supervised computer or device. The operation is similar to the frequency modify mode of the master or supervising computer or device as explained supra. A master device selects unique frequencies of operation for any and all of the slave devices coupled to inter-device link 302. The master device can receive command over the network to initiate the setting of slave device frequencies. The master device can likewise initiate the process on its own. The master device issues a frequency modify command through the inter-computer link targeting a particular slave device. When a slave device recognizes this frequency modify command processing continues at step 606. In step 606 if the frequency specified in the frequency modify command is different from the current operating frequency, processing continues at step 607. In step 607 the clock controller 105 of a slave device changes its operating frequency to the selected frequency by executing a bus 104 command to the bus programmable system clock 102. If however, at step 606 the selected frequency is found to be equal to the current slave operating frequency, then no operation occurs after step 606.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
 a plurality of proximate devices each having:
  an inter-device link which provides inter-device communication between each proximate device and said plurality of proximate devices;
  a programmable frequency clock; and
  a clock frequency controller which operates in a master operating mode and a slave operating mode and which couples said inter-device link and said programmable frequency clock and controls the frequency of said programmable frequency clock by:
   (a) detecting a master operating mode and performing one of:
    maintaining the current operating frequency as the master operating frequency; and
    setting the frequency of said programmable frequency clock to a predetermined master operating frequency; and
   (b) detecting a slave operating mode and:
    (b1) receiving a frequency modify command indicating a desired operating frequency wherein the frequency modify command is initiated by a proximate device operating in the master operating mode and wherein the frequency modify command is coupled through said inter-device link;
    (b2) ascertaining a difference in the desired operating frequency and a current operating frequency; and
    (b3) setting the frequency of said programmable frequency clock to the desired operating frequency when the difference is ascertained.

2. Apparatus of claim 1 wherein said clock frequency controller of said proximate device operating in the master operating mode further controls the frequency of a proximate device operating in the slave operating mode by:
 (c) recognizing the presence of said proximate device operating in the slave mode coupled through said inter-device link;

(d) identifying a unique frequency of operation for said proximate device operating in the slave operating mode; and (e) transmitting a frequency modify command indicating the unique frequency wherein the frequency modify command is coupled through said inter-device link.

3. Apparatus of claim 2 wherein the identification (d) of the unique frequency is based on a component of the unique frequency wherein the component is selected from the group consisting at a fundamental component and a harmonic component.

4. Apparatus of claim 1 wherein said predetermined master operating frequency is determined by:
(a1) detecting a master frequency selection mode and:
(a11) selecting a master device operating frequency; and
(a12) negating the master frequency selection mode and setting a master frequency modify mode; and
(a2) detecting the master frequency modify mode and:
(a21) ascertaining a difference between said master device operating frequency and a current operating frequency; and
(a22) setting the frequency of said programmable frequency clock to said master device operating frequency when the difference is ascertained.

5. Apparatus of claim 4 wherein said clock frequency controller of said proximate device operating in the master operating mode initiates a change in operating frequency by:
recognizing a master reset command; and
setting the master frequency selection mode.

6. Apparatus of claim 4 wherein the selection (a11) of said master device operating frequency is performed autonomically by:
(a111) selecting a candidate frequency from a plurality of available frequencies;
(a112) confirming the candidate frequency as acceptable; and
(a113) designating the candidate frequency as unavailable and reexecuting the selection of (a111) when the candidate frequency is not acceptable.

7. Apparatus of claim 6 wherein the plurality of available frequencies differ by an amount equal to or greater than a predetermined frequency differential.

8. Apparatus of claim 6 wherein the confirmation (a112) of the candidate frequency is based on a component of the candidate frequency wherein the component is selected from the group consisting of: a fundamental component and a harmonic component.

9. Apparatus of claim 1 wherein said clock frequency controller of said proximate device operating in the master operating mode resets the frequency of a proximate device operating in the slave operating mode by:
(f) recognizing a slave reset command;
(g) identifying a unique frequency of operation for said proximate device operating In the slave operating mode; and
(h) transmitting a frequency modify command indicating the unique frequency wherein the frequency modify command is coupled through said inter-device link.

10. Apparatus of claim 9 wherein the slave reset command is an external command.

11. Apparatus of claim 1 wherein said clock frequency controller of said proximate device operating in the master operating mode resets the frequency of all proximate devices operating in the slave operating mode and coupled through said inter-device link by:
(i) recognizing a slave reset all command;
(j) identifying a unique frequency of operation for each of said proximate devices operating in the slave operating mode; and
(k) transmitting a frequency modify command to each of said proximate devices operating in the slave operating mode indicating each of the unique frequencies wherein the frequency modify commands are coupled through said inter-device link;
whereby the operating frequencies of said proximate device operating in the master operating mode and each of the proximate devices operating in the slave operating mode are unique.

12. Apparatus of claim 11 wherein the slave reset all command is an external command.

* * * * *